US008803629B2

(12) United States Patent  
Shirakawa et al.

(10) Patent No.: US 8,803,629 B2  
(45) Date of Patent: *Aug. 12, 2014

(54) ELECTROMAGNETIC COUPLER AND INFORMATION COMMUNICATION DEVICE INCLUDING SAME

(75) Inventors: Yohei Shirakawa, Hitachi (JP); Kazuhiro Fujimoto, Hitachi (JP); Masamichi Kishi, Hitachinaka (JP); Naoto Teraki, Takahagi (JP)

(73) Assignee: Hitachi Metals, Ltd., Tokyo (JP)

( * ) Notice: Subject to any disclaimer, the term of this patent is extended or adjusted under 35 U.S.C. 154(b) by 331 days.

This patent is subject to a terminal disclaimer.

(21) Appl. No.: 13/080,128

(22) Filed: Apr. 5, 2011

(65) Prior Publication Data

US 2012/0007700 A1    Jan. 12, 2012

(30) Foreign Application Priority Data

Jul. 9, 2010   (JP) .................................. 2010-156507

(51) Int. Cl.  
*H01P 5/02*   (2006.01)  
*H01G 2/22*   (2006.01)

(52) U.S. Cl.  
CPC ... *H01P 5/02* (2013.01); *H01G 2/22* (2013.01)  
USPC .......................... 333/24 C; 333/24 R; 361/271

(58) Field of Classification Search  
CPC .................................... H01P 5/02; H01G 2/22  
USPC ................. 333/12, 24 R, 116, 24 C; 361/271  
See application file for complete search history.

(56) References Cited

U.S. PATENT DOCUMENTS

| 5,596,804 A * | 1/1997 | Hogge et al. ..................... 29/840 |
| 5,635,942 A | 6/1997 | Kushihi et al. |
| 7,518,465 B2 * | 4/2009 | Savic et al. ................. 333/24 R |
| 2010/0214173 A1 | 8/2010 | Harihara |

FOREIGN PATENT DOCUMENTS

| JP | 7-131233 | 5/1995 |
| JP | 2006-121315 | 5/2006 |
| JP | 2008-099236 | 4/2008 |
| JP | 2008-311688 | 12/2008 |

(Continued)

OTHER PUBLICATIONS

Notice of Rejection for corresponding Japanese application No. 2010-156507; Issue date: Nov. 19, 2013 and Partial English Translation.

(Continued)

*Primary Examiner* — Benny Lee  
*Assistant Examiner* — Rakesh Patel  
(74) *Attorney, Agent, or Firm* — Antonelli, Terry, Stout & Kraus, LLP.

(57) ABSTRACT

There is provided an electromagnetic coupler, which includes: a first conductor pattern and at least one second conductor pattern separated from the first conductor pattern, the first conductor pattern and the at least one second conductor pattern being formed in a first conductor layer; a feed pattern connected to a feeding system and a ground pattern separated from the feed pattern, the feed pattern and the ground pattern being composed of a conductor and formed in a second conductor layer; and a plurality of linear conductors electrically connecting the first conductor pattern with the feed pattern and connecting the second conductor pattern with the ground pattern, the plurality of linear conductors being formed between the first conductor layer and the second conductor layer. Furthermore, the first conductor layer and the second conductor layer are parallel to each other.

11 Claims, 12 Drawing Sheets

(56) References Cited

FOREIGN PATENT DOCUMENTS

| JP | 2008-311816 | 12/2008 |
| JP | 4345851 | 10/2009 |
| WO | WO 2007/049382 A1 | 5/2007 |

OTHER PUBLICATIONS

Haneishi et al., "Small and Planar Antennas," The Institute of Electronics, Information and Communication Engineers, 1996, pp. 22-23.

* cited by examiner

7 ELECTROMAGNETIC COUPLER

8 ELECTROMAGNETIC COUPLER (a)

(b)

14 ELECTROMAGNETIC COUPLER

ELECTROMAGNETIC COUPLER AND INFORMATION COMMUNICATION DEVICE INCLUDING SAME

CLAIM OF PRIORITY

The present application claims priority from Japanese patent application serial no. 2010-156507 filed on Jul. 9, 2010, the content of which is hereby incorporated by reference into this application.

BACKGROUND OF THE INVENTION

1. Field of the Invention

The present invention relates to electromagnetic couplers suitable for use in wireless communication systems to transfer information between information communication devices disposed at a short distance from each other via an electrostatic field or an induced electric field. The present invention also relates to information communication devices equipped with the electromagnetic couplers.

2. Description of Related Art

Conventional electromagnetic couplers include one disclosed in JP-B 4345851. This electromagnetic coupler (high-frequency coupler) is formed by connecting a plate-like electrode to a series inductor and a parallel inductor via a high-frequency transmission line. Such an electromagnetic coupler is to be disposed in an information communication device, such as a transmitter and a receiver. In the cases where a transmitter and a receiver are disposed so that the electrodes of their electromagnetic couplers face each other, when the distance between the two electrodes is $2\lambda/15$ or smaller of the wavelength $\lambda$ of the frequency used, the two electrodes are coupled by the electrostatic field component of longitudinal waves to behave as one capacitance and like a band pass filter as a whole, making it possible to efficiently communicate information between the two electromagnetic couplers. Also, when the distance between the two electrodes is in the range from $2\lambda/15$ to $8\lambda/15$ of the wavelength $\lambda$ of the frequency used, information can be transferred by using an induced electric field of longitudinal waves.

Meanwhile, when the distance between the electromagnetic couplers is greater than a certain value, information cannot be transferred. As a result, other wireless devices do not suffer interference from electromagnetic waves generated from the electromagnetic couplers, and a wireless communication system in which information communication devices equipped with the electromagnetic couplers are used does not suffer interference from other wireless communication systems. Because of these characteristics, wireless communication systems in which the conventional electromagnetic coupler is used make it possible, by using an electrostatic field or an induced electric field of longitudinal waves over a short distance, to communicate a large volume of data between information communication devices by using the UWB (Ultra Wide Band) communication system, in which wide band signals are used.

As described above, when the distance between the two electrodes is $2\lambda/15$ or smaller of the wavelength $\lambda$ of the frequency used, information can be efficiently communicated between the electromagnetic couplers by forming a band pass filter. In other words, the electrodes of the two conventional electromagnetic couplers are coupled by the electrostatic field component of longitudinal waves to behave as one capacitance, and a band pass filter is formed by the series and parallel inductors. However, when the match between the two electromagnetic couplers is not good, signal transmission efficiency is degraded.

On the other hand, in the case of wireless communications carried out by using devices provided with this electromagnetic coupler, for example, a cover of each device including a dielectric exists between the electromagnetic couplers, resulting in variations in the dielectric constant between the electromagnetic couplers. Then, variations occur in the value of the capacitance between the electrodes of the two electromagnetic couplers and in the frequency characteristics of the band pass filter, which in some cases may degrade the information transmission characteristics in the frequency band of interest. Even if the expected variations in the dielectric constant in some cases are taken into account in designing the electromagnetic couplers, in the case of wireless communications carried out by using other devices made of different materials and/or differently designed, the value of the dielectric constant between the electromagnetic couplers varies, which similarly degrades the information transmission characteristics in the frequency band of interest.

Also, when the distance between the electrodes of the two electromagnetic couplers is in the range from $2\lambda/15$ to $8\lambda/15$ of the wavelength $\lambda$ of the frequency used, information is communicated by using the induced electric field component of longitudinal waves. In this case, when the relative position of the two electromagnetic couplers and the environment are kept constant, the information transmission characteristics depend on matching conditions between the electromagnetic couplers and the feeding system. In other words, the signal intensity from the electromagnetic couplers to the communication module including the feeding system increases under a good matching condition, while the signal intensity from the electromagnetic couplers to the communication module including the feeding system decreases under a poor matching condition.

In the conventional art, electromagnetic couplers are designed so that a band pass filter is formed when the distance between the electromagnetic couplers is $2\lambda/15$ or smaller of the wavelength $\lambda$ of the frequency used; however, the matching condition when the distance between the electromagnetic couplers is in the range from $2\lambda/15$ to $8\lambda/15$ of the wavelength $\lambda$ of the frequency used is not particularly taken into account in design. Therefore, in the case of an insufficient signal intensity when the distance between the electromagnetic couplers is in the range from $2\lambda/15$ to $8\lambda/15$ of the wavelength $\lambda$ of the frequency used, for example, a redesign is required with a view to forming a band pass filter when the distance between the electromagnetic couplers is $2\lambda/15$ or smaller of the wavelength $\lambda$ of the frequency used. This means that much time and effort is required in designing the electromagnetic couplers. In addition, when the frequency band to be used is broad, it is required to obtain a large number of frequencies in which the matching condition is suitable, which means that even more time and effort is required.

SUMMARY OF THE INVENTION

In view of the foregoing, it is an objective of the present invention to provide an electromagnetic coupler whose information transmission characteristics are equivalent to those in the conventional art and hardly affected by variations in the dielectric constant between electromagnetic couplers. Furthermore, it is another objective of the present invention to provide an electromagnetic coupler having information transmission characteristics equivalent to those in the conventional art with which matching adjustments with a feeding system and frequency band adjustments can be easily made. As described above, the electromagnetic coupler according to the invention is aimed at near-field communications and it is desired that no communications be made between two electromagnetic couplers over a long distance exceeding a certain value.

According to one aspect of the present invention, there is provided an electromagnetic coupler, which includes:

a first conductor pattern and at least one second conductor pattern separated from the first conductor pattern, the first conductor pattern and the at least one second conductor pattern being formed in a first conductor layer;

a feed pattern connected to a feeding system and a ground pattern separated from the feed pattern, the feed pattern and the ground pattern being composed of a conductor and formed in a second conductor layer; and a plurality of linear conductors electrically connecting the first conductor pattern with the feed pattern and connecting the second conductor pattern with the ground pattern, the plurality of linear conductors being formed between the first conductor layer and the second conductor layer, in which the first conductor layer and the second conductor layer are parallel to each other.

In the above aspect of the invention, the following modifications and changes can be made.

i) The plurality of linear conductors are formed perpendicularly to the second conductor layer.

ii) A dielectric layer is formed between the first conductor layer and the second conductor layer, and each of the linear conductors is a conductor formed inside a through hole formed in the dielectric layer.

iii) The first conductor layer, the second conductor layer, and the dielectric layer therebetween are made of a two-layer printed circuit board.

iv) The second conductor pattern is formed such that it faces the ground pattern.

v) The first conductor pattern is configured such that it extends toward the second conductor pattern, and the second conductor pattern is configured around at least the end of the first conductor pattern.

vi) The first conductor pattern has a broad end.

vii) The second conductor pattern is composed of a plurality of conductor patterns, and the first conductor pattern is configured such that it extends radially toward each of the plurality of conductor patterns composing the second conductor pattern.

viii) Each of the plurality of conductor patterns composing the second conductor pattern is connected to the ground pattern by the linear conductors.

ix) Each of the first conductor pattern and the second conductor pattern is configured into a rectangular shape.

x) The second conductor pattern is composed of four rectangular conductor patterns, and the rectangular conductor patterns are arranged radially such that each of them faces each of the circumferential sides of the first conductor pattern.

xi) The second conductor pattern and the linear conductors are configured such that they are symmetrical with respect to the connection point between the first conductor pattern and the linear conductors.

xii) The shortest distance between the first conductor pattern and the second conductor pattern is $\lambda/8$ or smaller with respect to the wavelength $\lambda$ of the central frequency of the frequency band of interest for the electromagnetic coupler.

xiii) There is provided an information communication device including the above-described electromagnetic coupler to communicate information by using an electrostatic or an induced electric field.

Advantages of the Invention

According to the present invention, it is possible to provide an electromagnetic coupler whose information transmission characteristics are equivalent to those in the conventional art and hardly affected by variations in the dielectric constant between electromagnetic couplers. Also, it is possible to provide an electromagnetic coupler having information transmission characteristics equivalent to those in the conventional art with which matching adjustments with a feeding system and frequency band adjustments can be easily made.

DETAILED DESCRIPTION OF THE PREFERRED EMBODIMENTS

[Basic Concept of the Invention]

Figure 1:
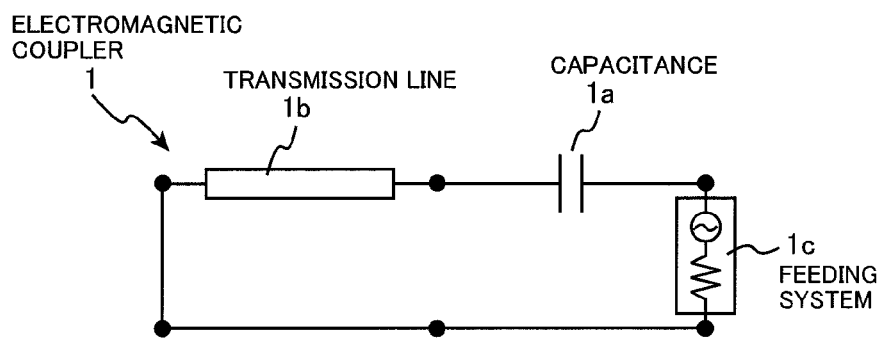
FIG. 1 is a diagram showing a model of an electromagnetic coupler in accordance with an embodiment of the present invention.

FIG. 1 is a diagram showing a model of an electromagnetic coupler in accordance with an embodiment of the present invention. According to the present invention, one of the problems described above is solved by using an electromagnetic coupler 1 illustrated as the model shown in FIG. 1. As illustrated, the electromagnetic coupler 1 of FIG. 1 is composed of one capacitance 1a and one transmission line 1b. Based on JP-A 2006-121315, the input impedance $Z_{in}$ of the electromagnetic coupler 1 can be approximated by the following equation (1):

$$Z_{in} = \frac{Z_0 l \alpha \omega}{v} + j\left(\frac{Z_0 l \omega}{v} - \frac{1}{\omega C}\right) \quad \text{Eq. (1)}$$

where $Z_O$ represents the characteristic impedance of the transmission line 1b; α represents the loss constant of the transmission line 1b; l (el) represents the electrical length of the transmission line 1b; C represents the capacitance 1a; v represents the velocity of the electromagnetic wave; ω represents the angular frequency of the electromagnetic wave, j represents an imaginary unit; and "ωl/v<<1" is satisfied.

In order to improve the matching with a feeding system, the input impedance $Z_{in}$ of the electromagnetic coupler needs to be the complex conjugate of the impedance of the feeding system. As shown by Eq. (1), the input impedance $Z_{in}$ of the electromagnetic coupler 1 of FIG. 1 is a complex number composed of a real part and an imaginary part. While the loss constant α exists only in the real part, the capacitance C exists only in the imaginary part. As a result, the real part and the imaginary part can be adjusted independently, and therefore matching adjustments with the feeding system can be easily made.

Also, the matching condition can be generally expressed by the following equation (2):

$$\Gamma = \frac{Z_{in} - Z_F}{Z_{in} + Z_F} = 1 - \frac{2Z_F}{Z_{in} + Z_F} \quad \text{Eq. (2)}$$

where G is a reflection coefficient and $Z_F$ is the impedance of the feeding system.

As shown by Eq. (2), the number of frequencies, namely the frequency band where the matching condition is suitable, depends on the frequency characteristics of the reflection coefficient G. Also, since the impedance $Z_F$ of the feeding system is generally constant, the frequency band depends on the frequency characteristics of the input impedance $Z_{in}$ of the electromagnetic coupler 1. In addition, the frequency band depends on a rate of variation of the reflection coefficient G to frequency. For example, a small rate of variation of the reflection coefficient G to frequency is suitable to obtain a narrow band, and conversely, a large rate of variation of the reflection coefficient G to frequency is suitable to obtain a broad band. This relationship holds also between the input impedance $Z_{in}$ of the electromagnetic coupler 1 and frequency. Based on Eq. (1), the rate of variation of the input impedance $Z_{in}$ of the electromagnetic coupler 1 of the present invention to frequency (angular frequency ω) can be expressed by the following equation (3):

$$\frac{\partial Z_{in}}{\partial \omega} = \frac{Z_0 l \alpha}{v} + j\left(\frac{Z_0 l}{v} + \frac{1}{\omega^2 C}\right) \quad \text{Eq. (3)}$$

As shown by Eq. (3), a wider bandwidth can be obtained either by decreasing the characteristic impedance $Z_O$ of the transmission line 1b, decreasing the electrical length l of the transmission line 1b, decreasing the loss constant α of the transmission line 1b, or increasing the capacitance C of 1a. As just described, in an electromagnetic coupler 1 in accordance with an embodiment of the present invention, the rate of variation of the matching condition to frequency is adjustable, and also, as described earlier, matching adjustments can be easily made. Consequently, frequency band adjustments can be easily made.

In addition, because the structure shown in FIG. 1 is a simple structure composed of a transmission line and a capacitance, it can be fabricated in, e.g., a two-layer printed circuit board.

Next, preferred embodiments of the present invention will be described below with reference to the accompanying drawings. The invention is not limited to the specific embodiments described below, but various modifications and combinations are possible without departing from the spirit and scope of the invention.

[First Embodiment of the Invention]

Figure 2:
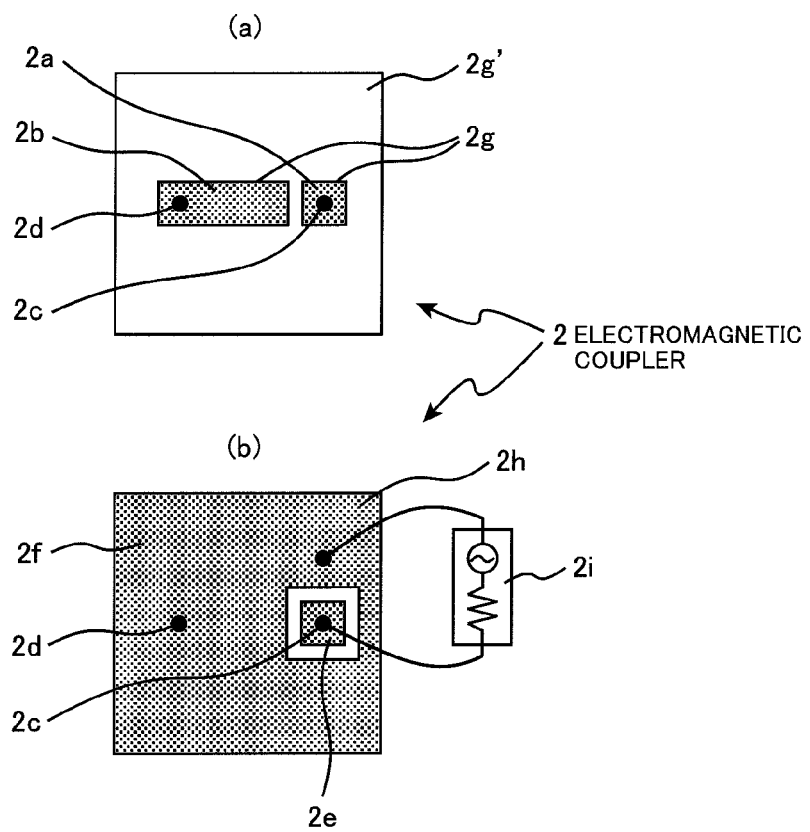
FIGS. 2a and 2b are schematic illustrations showing a plan view of an electromagnetic coupler in accordance with a first embodiment of the present invention.

An electromagnetic coupler in accordance with a first embodiment of the present invention will be described hereinafter with reference to FIG. 2. FIG. 2 is schematic illustrations showing a plan view of an electromagnetic coupler in accordance with a first embodiment of the present invention. Specifically, FIG. 2(a) shows a first conductor layer of the electromagnetic coupler, and FIG. 2(b) shows a second conductor layer of the electromagnetic coupler viewed in perspective from the first conductor layer side.

In the present embodiment, a two-layer printed circuit board is used for the electromagnetic coupler 2. The two-layer printed circuit board has a first conductor layer 2g on one side and a second conductor layer 2h on the other side. Conductor patterns of the electromagnetic coupler 2 are formed in the conductor layers 2g and 2h.

In the electromagnetic coupler 2 shown in FIG. 2, a first conductor pattern 2a and a second conductor pattern 2b separated from this first conductor pattern 2a are formed in the first conductor layer 2g of the printed circuit board, the first conductor layer 2g being disposed on one side of a dielectric layer 2g' of the printed circuit board. In the second conductor layer 2h on the other side of the printed circuit board are formed a feed pattern 2e composed of a conductor and connected to a feeding system 2i and a ground pattern 2f composed of a conductor and separated from the feed pattern 2e. The first conductor layer 2g and the second conductor layer 2h are parallel to each other.

The second conductor pattern 2b is larger than the first conductor pattern 2a and is formed such that the second conductor pattern 2b entirely faces the ground pattern 2f. Also, the shortest distance between the first conductor pattern 2a and the second conductor pattern 2b is λ/8 or smaller with respect to the wavelength λ of the central frequency of the frequency band of interest of the electromagnetic coupler 2.

The first conductor pattern 2a and the feed pattern 2e, and the second conductor pattern 2b and the ground pattern 2f are electrically connected by linear conductors 2c and 2d, respectively, formed perpendicularly to the second conductor layer 2h (and the ground pattern 2f). Each of the linear conductors 2c and 2d is a conductor formed inside a through hole formed in the printed circuit board. Each of the conductors may be formed such that it fills the through hole or it thinly covers an interior surface of the through hole.

The linear conductor $2c$ is connected to the first conductor pattern $2a$ on one end and to the feed pattern $2e$ on the other end. Therefore, the first conductor pattern $2a$ and the feed pattern $2e$ are electrically connected by means of the linear conductor $2c$. Also, the linear conductor $2d$ is connected to the second conductor pattern $2b$ on one end and to the ground pattern $2f$ on the other end. Therefore, the second conductor pattern $2b$ and the ground pattern $2f$ are electrically connected by the linear conductor $2d$. The feeding system $2i$ is connected between the feed pattern $2e$ and the ground pattern $2f$. That is, power is fed from the feed pattern $2e$ to the ground pattern $2f$. In addition, the air gap between the first conductor pattern $2a$ and the second conductor pattern $2b$ behaves as the capacitance $1a$ in FIG. 1, and the second conductor pattern $2b$ behaves as the transmission line $1b$ in FIG. 1.

Power can be fed from the feeding system $2i$ to the electromagnetic coupler 2 by means of a coaxial cable, for example. The center conductor of the coaxial cable is connected to the feed pattern $2e$, and the outer conductor of the coaxial cable is connected to the ground pattern $2f$. Feeding power from the feeding system $2i$ to the electromagnetic coupler 2 allows an electric current to flow through the first conductor pattern $2a$, the second conductor pattern $2b$, and the linear conductors $2c$ and $2d$, causing the longitudinal wave component of electromagnetic waves to radiate from the currents through the linear conductors $2c$ and $2d$ in the direction parallel to the two linear conductors $2c$ and $2d$. The amplitude of the longitudinal wave component is in a positive correlation with the matching condition between the electromagnetic coupler 2 and the feeding system $2i$.

As described above, in the electromagnetic coupler 2 in accordance with the present invention, matching adjustments can be easily made. Therefore, adjustments of the amplitude of the longitudinal wave component can be easily made, which makes it possible to carry out sufficient communication of information. Moreover, unlike the case with the conventional art, a band pass filter structure is not used in the electromagnetic coupler 2, making it possible to reduce the above-described degradation of information transmission characteristics due to variations in the dielectric constant between electromagnetic couplers.

Besides, in the conventional electromagnetic coupler, an electrode, a series inductor, a parallel inductor, and a capacitance are required to form a band pass filter, and the electrode is disposed on a layer independent of the series inductor, the parallel inductor, and a ground pattern. One method to obtain this configuration includes the steps of: forming a series inductor and a parallel inductor on one layer of a two-layer printed circuit board; forming a ground pattern on the other layer of the two-layer printed circuit board; and connecting an electrode to these layers. Another method includes the steps of: forming an electrode, a series inductor and a parallel inductor, and a ground pattern on a first layer, a second layer, and a third layer, respectively, of a three-layer printed circuit board; and connecting the electrode and the inductors by linear conductors. However, these methods complicate the structure of an electromagnetic coupler, and thus can be costly.

Meanwhile, according to the present invention, an electromagnetic coupler can be fabricated by using a two-layer printed circuit board, such as an FR4 (Flame Retardant Type 4) printed circuit board, as is the case with the first embodiment. Consequently, the electromagnetic coupler according to the present invention is simple in structure and can be fabricated at low cost.

Also, through the second conductor pattern $2b$ and the ground pattern $2f$, which are disposed such that they face each other, electric currents flow in the opposite direction to each other. As a result, the electric field generated by the current flowing through the second conduct pattern $2b$ is canceled by the electric field generated by the current flowing through the ground pattern $2f$. The attenuation of traverse waves is smaller than that of longitudinal waves with respect to distance, which poses a problem that the occurrence of traverse waves allows unintended far-field communications. However, in the electromagnetic coupler 2, the occurrence of traverse waves due to the current flowing through the second conductor pattern $2b$ can be suppressed.

The same holds true for the first conductor pattern $2a$. Since the first conductor pattern $2a$ and the feed pattern $2e$ are formed such that they face each other, electric currents flow through the first conductor pattern $2a$ and the feed pattern $2e$ in the opposite direction to each other. As a result, the electric field generated by the current flowing through the first conductor pattern $2a$ is canceled by the electric field generated by the current flowing through the feed pattern $2e$.

Therefore, the electromagnetic coupler according to the present invention is highly suitable for use in a wireless communication system to transfer information between information communication devices disposed at a short distance from each other via an electrostatic field or an induced electric field. The electric field generated by the current flowing through the ground pattern $2f$ has the highest possible effect of canceling the electric field generated from the current flowing through the second conductor pattern $2b$ when the first conductor layer $2g$ and the second conductor layer $2h$ are parallel to each other.

As described above, according to the first embodiment of the present invention, there can be provided an electromagnetic coupler whose information transmission characteristics are hardly affected by variations in the dielectric constant with another electromagnetic coupler with which it communicates information. Accordingly, even in the case of an electromagnetic coupler disposed in a covered device including a dielectric, the degradation of the information transmission characteristics can be reduced, which allows the electromagnetic coupler to be easily applied to a wider range of information communication devices.

In addition, there can be provided an electromagnetic coupler having a capacity to transmit information equivalent to the conventional art with which matching adjustments with a feeding system can be easily made. Generally, in the case of an electromagnetic coupler disposed in a device, the frequency characteristics of the electromagnetic coupler need to be adjusted according to the space and the environment in which the electromagnetic coupler is disposed. However, according to the first embodiment of the present invention, matching adjustments with the feeding system can be easily made, which reduces the time required for these adjustments and thus makes it possible to provide an optimal electromagnetic coupler speedily.

[Second Embodiment of the Invention]

As described above, in the structure shown in FIG. 2, near-field information communications is carried out by using the longitudinal component of electric fields generated from the electric currents flowing through the two linear conductors $2c$ and $2d$, the longitudinal components being parallel to the linear conductors $2c$ and $2d$. At the same time, traverse waves due to the electric currents flowing through the first conductor pattern 2a and the second conductor pattern 2b are suppressed. However, if these traverse waves are not sufficiently suppressed, the occurrence of traverse waves due to the currents flowing through the first conductor pattern 2a and the second conductor pattern 2b can allow unintended far-field communications. In order to avoid these undesirable communications (far-field communications), the first conductor pattern 2a and the second conductor pattern 2b in the first conductor layer 2g in FIG. 2 have been modified in a second embodiment as shown by FIG. 3.

Figure 3:
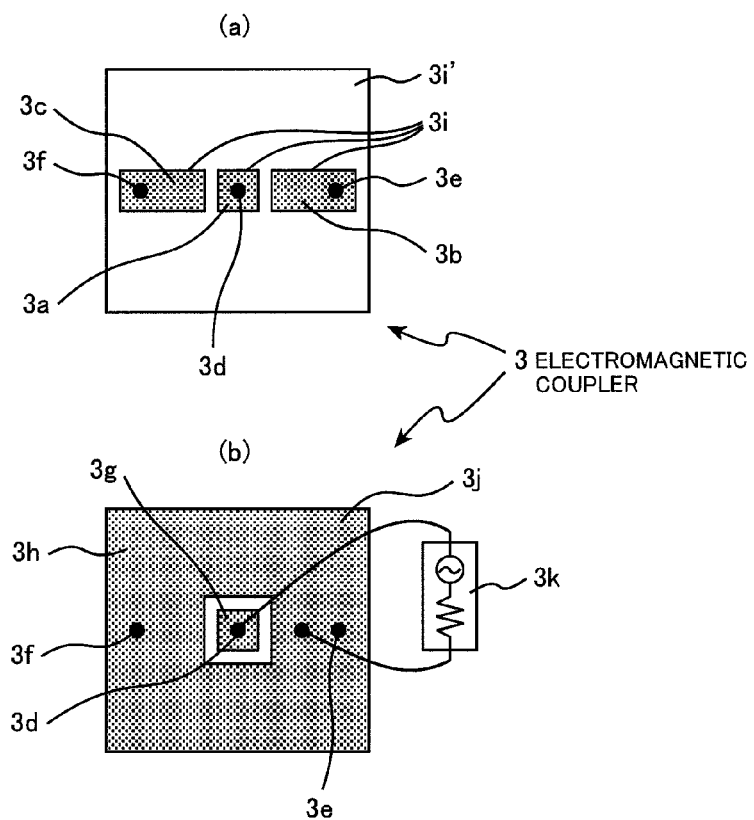
FIG. 3a and 3b are schematic illustrations showing a plan view of an electromagnetic coupler in accordance with a second embodiment of the present invention.

FIG. 3 is schematic illustrations showing a plan view of an electromagnetic coupler 3 in accordance with the second embodiment of the present invention. In the same manner with FIG. 2, FIG. 3(a) shows a first conductor layer of the electromagnetic coupler, and FIG. 3(b) shows a second conductor layer of the electromagnetic coupler viewed in perspective from the first conductor layer side.

More specifically, the electromagnetic coupler 3 of the second embodiment, as shown in FIG. 3, includes: a first conductor pattern 3a and two rectangular conductor patterns 3b and 3c as second conductor patterns separated from the first conductor pattern 3a, the first conductor pattern 3a and the rectangular conductor patterns 3b and 3c being formed in a first conductor layer 3i of a printed circuit board, the first conductor layer 3i being disposed on one side of a dielectric layer 3i' of the printed circuit board. In a second conductor layer 3j on the other side of the printed circuit board are formed a feed pattern 3g connected to a feeding system 3k and a ground pattern 3h separated from the feed pattern 3g, the feed pattern 3g and the ground pattern 3h being composed of a conductor.

The first conductor pattern 3a and the feed pattern 3g are electrically connected by means of a linear conductor 3d formed perpendicularly to the second conductor layer 3j of the printed circuit board. Also, the conductor pattern 3b and the conductor pattern 3c as the second conductor patterns and the ground pattern 3h are electrically connected by a linear conductor 3e and a linear conductor 3f, respectively, formed perpendicularly to the second conductor layer 3j of the printed circuit board. These linear conductors 3d, 3e, and 3f are formed inside through holes formed in the printed circuit board. The linear conductor 3d is connected to the first conductor pattern 3a on one end and to the feed pattern 3g on the other end. The linear conductor 3e and the linear conductor 3f are connected on one end to the conductor pattern 3b and the conductor pattern 3c, respectively, which are the second conductor patterns, and are connected to the ground pattern 3h on the other end. The feeding system 3k is connected between the feed pattern 3g and the ground pattern 3h. That is, power is fed from the feed pattern 3g to the ground pattern 3h in the electromagnetic coupler 3.

The conductor patterns 3b and 3c as the second conductor patterns are of the same shape and disposed such that they sandwich the first conductor pattern 3a. This arrangement allows the traverse wave components of the electric fields generated from the conductor patterns 3b and 3c to cancel each other, thus reducing the traverse wave components. In particular, when the first conductor pattern 3a, the two conductor patterns 3b and 3c, and the three linear conductors 3d, 3e, and 3f are disposed such that they are symmetrical with respect to the connection point between the first conductor pattern 3a and the linear conductor 3d, electric currents of the same magnitude flow through the two conductor patterns 3b and 3c in the opposite direction to each other, which makes it possible to further reduce the traverse wave components of the electric fields generated from these currents. In addition, in the present embodiment, the ground pattern 3h is formed around the feed pattern 3g, which further prevents the occurrence of traverse waves.

Figure 4:
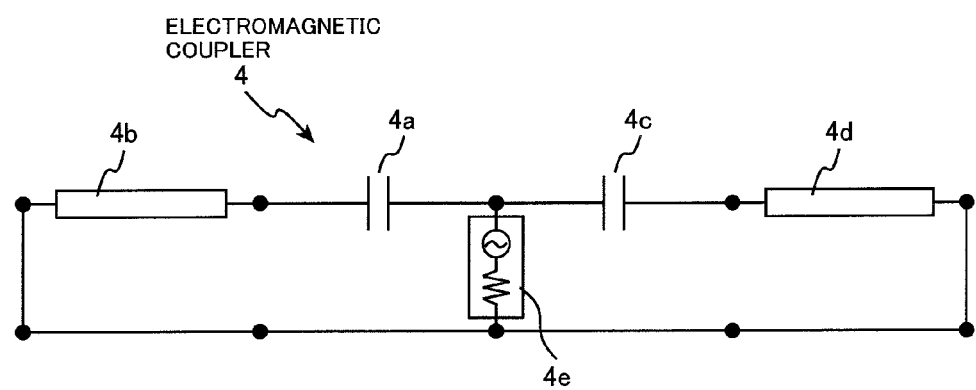
FIG. 4 is a diagram showing a model of an electromagnetic coupler in accordance with the second embodiment of the present invention.

The advantages of this electromagnetic coupler 3 will be described in further detail. FIG. 4 is a diagram showing a model of an electromagnetic coupler in accordance with the second embodiment of the present invention. The input impedance $Z_{in}'$ of this electromagnetic coupler 4 can be expressed by the following equation (4):

$$Z_{in}' = 0.5\left[\frac{Z_0' l' \alpha' \omega}{v} + j\left(\frac{Z_0' l' \omega}{v} - \frac{1}{\omega C'}\right)\right] \qquad \text{Eq. (4)}$$

where $Z_O'$ represents the characteristic impedance of the transmission lines 4b and 4d; α' represents the loss constant of the transmission lines 4b and 4d; l' represents the electrical length of the transmission lines 4b and 4d; C' represents the capacitance value of capacitances 4a and 4c; v represents the velocity of the electromagnetic wave; ω represents the angular frequency of the electromagnetic wave; and "ωl'/v<<1" is satisfied.

As shown by Eq. (4), the input impedance $Z_{in}'$ of the structure in FIG. 4 is the same as that in FIG. 1. Therefore, also in the electromagnetic coupler shown in FIGS. 3 and 4, matching adjustments and frequency band adjustments can be made as easily as in the electromagnetic coupler shown in FIGS. 1 and 2.

Figure 5:
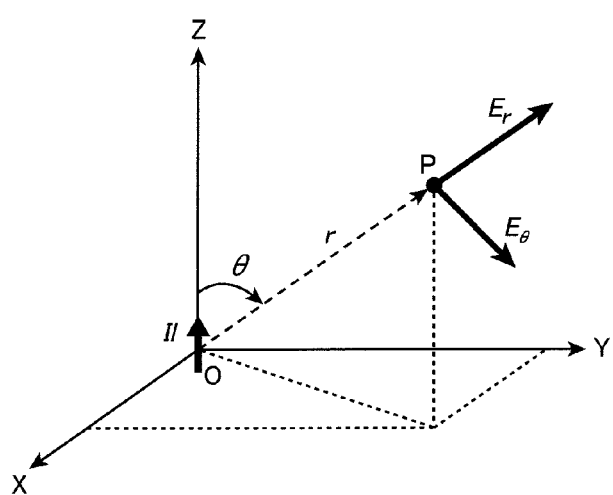
FIG. 5 is a diagram for explaining a longitudinal wave and a traverse wave in an electric field.

FIG. 5 is a diagram for explaining a longitudinal wave and a traverse wave in an electric field. As shown in FIG. 5, there are a longitudinal wave ($E_r$) and a traverse wave ($E_\theta$) in an electric field generated by an infinitesimal dipole (Il, current I and electrical length l), and $E_r$ and $E_\theta$ are expressed by the following equations (5) and (6), respectively (see, e.g., non-patent literature 1). Non-patent literature 1: "SMALL AND PLANAR ANTENNAS" by Misao Haneishi et al., published by The Institute of Electronics, Information and Communication Engineers, pp. 22-23.

$$E_r = \frac{Il}{2\pi}\exp(-jk_0 r)\left\{\frac{\eta_0}{r^2} + \frac{1}{jw\varepsilon_0 r^3}\right\}\cos\theta \qquad \text{Eq. (5)}$$

$$E_\theta = \frac{Il}{4\pi}\exp(-jk_0 r)\left\{\frac{jw\mu_0}{r} + \frac{\eta_0}{r^2} + \frac{1}{jw\varepsilon_0 r^3}\right\}\sin\theta \qquad \text{Eq. (6)}$$

Herein, Il represents an infinitesimal dipole passing through the origin 0 and existing along the Z-axis; $\eta_0$ represents the characteristic impedance; $E_r$ represents the longitudinal wave at the observation point P; $E_\theta$ represents the traverse wave at the observation point P; r represents the distance from the infinitesimal dipole Il to the observation point P; $k_0$ represents the wave number; j represents an imaginary unit; w represents the angular frequency; $\in_0$ represents the dielectric constant of a vacuum; $\mu_0$ represents the permeability constant of a vacuum; and θ represents the angle between the Z-axis (infinitesimal dipole) and the observation point P.

Figure 6:
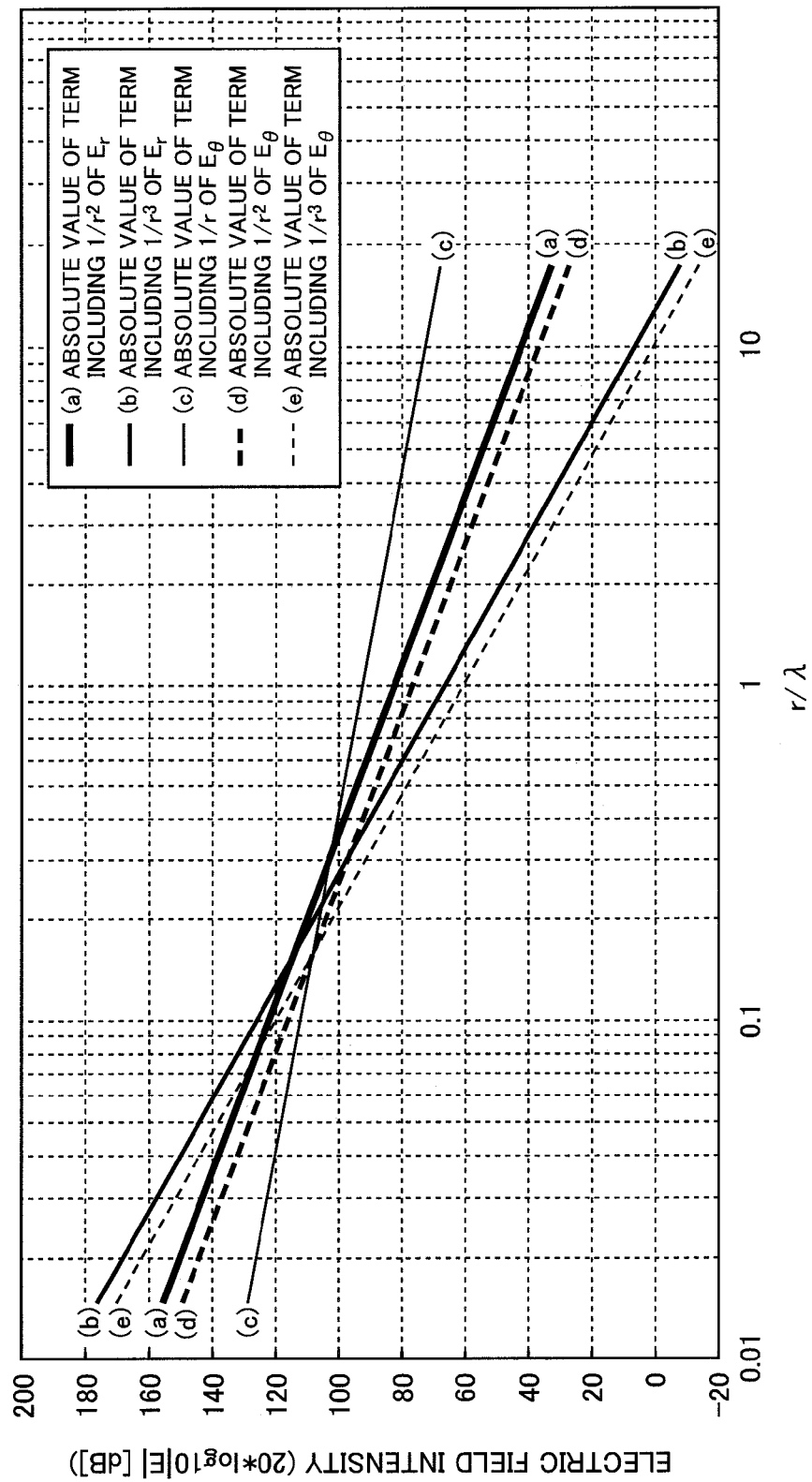
FIG. 6 is a graph showing a relationship between a distance-wavelength ratio ($r/\lambda$) in the electric field and an electric field intensity calculated based on Eqs. (5) and (6).

FIG. 6 is a graph showing a relationship between a distance-wavelength ratio (r/λ) in the electric field and an electric field intensity calculated based on Eqs. (5) and (6). In FIG. 6, the horizontal axis of the graph shows the distance-wavelength ratio (r/λ) in the electric field, and the vertical axis of the graph shows the electric field intensity. In FIG. 6 are shown the following five electric field component amplitudes:

(a) The absolute value of the term including $1/r^2$ of the longitudinal wave $E_r$;

(b) The absolute value of the term including $1/r^3$ of the longitudinal wave $E_r$;

(c) The absolute value of the term including $1/r$ of the traverse wave $E_\theta$;

(d) The absolute value of the term including $1/r^2$ of the traverse wave $E_\theta$; and (e) The absolute value of the term including $1/r^2$ of the traverse wave $E_\theta$.

In the second embodiment shown in FIG. 3, two of the electromagnetic couplers 2 according to the first embodiment are connected in parallel such that they share the linear conductor 2c and are symmetrical with respect to the connection point between the first conductor pattern 3a and the linear conductor 3d in the first conductor layer 3i. As a result, the electric currents flow through the conductor patterns 3b and 3c in the opposite direction to each other, and therefore the traverse wave components of the electric fields generated by these currents are canceled, making it possible to reduce the radiation of the traverse wave components. Meanwhile, in the electromagnetic coupler 3, the electromagnetic wave based on the term including $1/r^2$ of the longitudinal wave and the term including $1/r^3$ of the longitudinal wave in Eqs. (5) and (6) radiates in the direction parallel to the linear conductors 3d, 3e, and 3f. Therefore, the electromagnetic coupler 3 is highly suitable for use in a wireless communication system to transfer information between information communication devices disposed at a short distance from each other via an electrostatic field or an induced electric field.

[Third Embodiment of the Invention]

Figure 7:
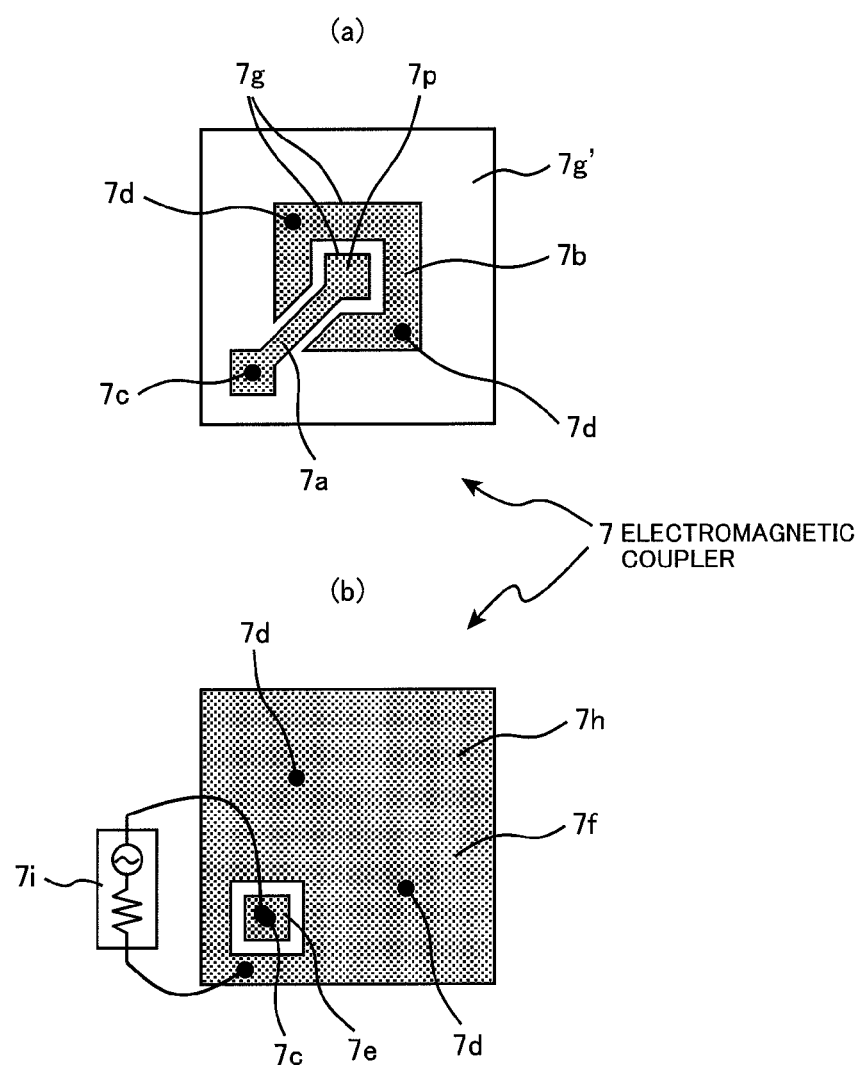
FIG. 7a and 7b are schematic illustrations showing a plan view of an electromagnetic coupler in accordance with a third embodiment of the present invention.

A third embodiment of the present invention will be described hereinafter with reference to FIG. 7. FIG. 7 is schematic illustrations showing a plan view of an electromagnetic coupler in accordance with a third embodiment of the present invention. In the same manner with FIG. 2, FIG. 7(a) shows a first conductor layer of the electromagnetic coupler, and FIG. 7(b) shows a second conductor layer of the electromagnetic coupler viewed in perspective from the first conductor layer side.

An electromagnetic coupler 7 in accordance with the third embodiment is composed of a two-layer printed circuit board including a dielectric layer 7g' as a substrate. The two-layer printed circuit board has a first conductor layer 7g on one side and a second conductor layer 7h on the other side. Conductor patterns of the electromagnetic coupler 7 are formed in the conductor layers 7g and 7h. In the electromagnetic coupler 7 shown in FIG. 7, a first conductor pattern 7a and a second conductor pattern 7b separated from this first conductor pattern 7a are formed in the first conductor layer 7g of the printed circuit board; and a feed pattern 7e composed of a conductor and connected to a feeding system 7i and a ground pattern 7f composed of a conductor and separated from the feed pattern 7e are formed in the second conductor layer 7h of the printed circuit board.

In the present embodiment, the first conductor pattern 7a is configured such that it extends toward the second conductor pattern 7b. Also, the first conductor pattern 7a has a broad end portion 7p. Meanwhile, the second conductor pattern 7b is configured around at least the end portion 7p of the first conductor pattern 7a. The second conductor pattern 7b is larger than the first conductor pattern 7a and is arranged such that it entirely faces the ground pattern 7f. In addition, the shortest distance between the first conductor pattern 7a and the second conductor pattern 7b is $\lambda/8$ or smaller with respect to the wavelength $\lambda$, of the central frequency of the frequency band of interest of the electromagnetic coupler 7.

The first conductor pattern 7a and the feed pattern 7e are electrically connected by a linear conductor 7c formed perpendicularly to the second conductor layer 7h. In other words, the linear conductor 7c is connected to the first conductor pattern 7a on one end and to the feed pattern 7e on the other end. Similarly, the second conductor pattern 7b and the ground pattern 7f are electrically connected by two linear conductors 7d formed perpendicularly to the second conductor layer 7h. In other words, each of the two linear conductors 7d is connected to the second conductor pattern 7b on one end and to the ground pattern 7f on the other end. Each of the linear conductors 7c and 7d is a conductor formed inside a through hole formed in the printed circuit board.

The third embodiment aims to increase the capacitance 1a in the model shown in FIG. 1 as compared to the first embodiment. More specifically, by increasing a length of the sides along which the first conductor pattern 7a and the second conductor pattern 7b face each other as compared to the electromagnetic coupler 2 in the first embodiment, the capacitance between the first conductor pattern 7a and the second conductor pattern 7b can be increased as compared to the first embodiment. As shown by Eqs. (1) and (4), increasing the capacitance leads to decrease the resonant frequency (angular frequency ω) when the imaginary part of the input impedance of an electromagnetic coupler is zero. Therefore, according to the present embodiment, it is possible to fabricate a smaller electromagnetic coupler.

Also, since the capacitance (e.g., 1a) can take on a wider range of values, the matching condition and the frequency band of an electromagnetic coupler can be maintained despite variations in the characteristic impedance $Z_0$, the loss constant α, and the electrical length l of the transmission line due to variations in the thickness and the dielectric material of the electromagnetic coupler, as shown by Eqs. (1), (2), and (3). Therefore, according to the present embodiment, it is possible to expand the possibility of electromagnetic coupler design and to fabricate a thinner and smaller electromagnetic coupler.

Besides, since the first conductor pattern 7a has the broad end portion 7p, the first conductor pattern 7a and the second conductor pattern 7b face each other along longer sides. The end portion 7p may be configured in the shape of a circle or a star, instead of a rectangular as shown in FIG. 7.

Also, through the second conductor pattern 7b and the ground pattern 7f, which are disposed such that they face each other, electric currents flow in the opposite direction to each other. As a result, the electric field generated by the current flowing through the second conductor pattern 7b is canceled by the electric field generated by the current flowing through the ground pattern 7f, and therefore, the occurrence of traverse waves due to the current flowing through the second conductor pattern 7b can be suppressed. The occurrence of traverse waves due to the current flowing through the second conductor pattern 7b can be most effectively suppressed when the first conductor layer 7g and the second conductor layer 7h are parallel to each other.

Meanwhile, since the first conductor pattern 7a faces the feed pattern 7e, the ground pattern 7f, and the non-conductor portion between the feed pattern 7e and the ground pattern 7f, the effect of suppressing the occurrence of traverse waves is not large. However, because the first conductor pattern 7a is smaller than the second conductor pattern 7b, the occurrence of traverse waves is smaller than the second conductor pattern 7b. Therefore, it is possible to effectively suppress the occurrence of traverse waves by arranging the second conductor pattern 7b such that it faces the ground pattern 7f.

[Fourth Embodiment of the Invention]

Figure 8:
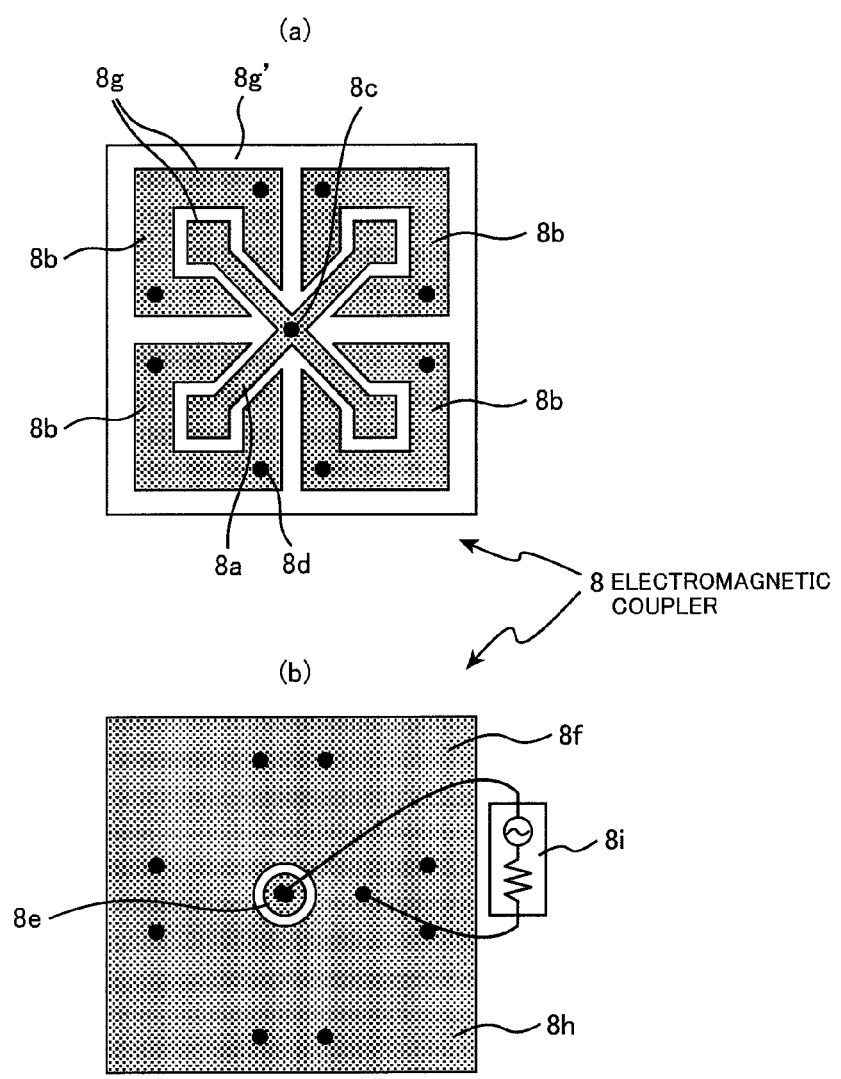
FIG. 8a and 8b are schematic illustrations showing a plan view of an electromagnetic coupler in accordance with a fourth embodiment of the present invention.

A fourth embodiment of the present invention will be described hereinafter with reference to FIG. 8. FIG. 8 is schematic illustrations showing a plan view of an electromagnetic coupler in accordance with a fourth embodiment of the present invention. In the same manner with FIG. 2, FIG. 8(a) shows a first conductor layer of the electromagnetic coupler, and FIG. 8(b) shows a second conductor layer of the electromagnetic coupler viewed in perspective from the first conductor layer side.

As shown in FIG. 8, in an electromagnetic coupler 8 in accordance with the fourth embodiment, four of the electromagnetic couplers 7 according to the third embodiment are connected in parallel such that they share the linear conductor 7c. More specifically, the electromagnetic coupler 8 includes: a first conductor pattern 8a extending radially from the center of a printed circuit board in four directions and four second conductor patterns 8b separated from the first conductor pattern 8a, the first conductor pattern 8a and the second conductor patterns 8b being formed in a first conductor layer 8g, the first conductor layer 8g being disposed on one side of a dielectric layer 8g' of the printed circuit board; a feed pattern 8e connected to a feeding system 8i and a ground pattern 8f separated from this feed pattern 8e, the feed pattern 8e and the ground pattern 8f being formed in a second conductor layer 8h on the other side of the printed circuit board; and a linear conductor 8c formed at the center of the first conductor pattern 8a. In addition, two linear conductors 8d are formed between the ground pattern 8f and each of the second conductor patterns 8b.

The linear conductor 8c is connected to the first conductor pattern 8a on one end and to the feed pattern 8e on the other end. Similarly, each of the linear conductors 8d is connected to each of the second conductor patterns 8b on one end and to the ground pattern 8f on the other end. The linear conductors 8c and 8d are formed perpendicularly to the second conductor layer 8h.

In the electromagnetic coupler 8 thus formed, conductor patterns in the first conductor layer 8g have a symmetrical configuration with respect to the connection point between the first conductor pattern 8a and the linear conductor pattern 8c. As a result, in the electromagnetic coupler 8 of the present embodiment, the traverse wave components of the electromagnetic waves radiated from the first conductor pattern 8a and the second conductor pattern 8b are canceled, making it possible to reduce the radiation of the traverse wave components. Also, in the electromagnetic coupler 8 of the present embodiment, because four of the electromagnetic coupler 7 are formed, the arrangement of the linear conductors 8c and 8d radiating longitudinal waves extends over a wider area, making it possible to fabricate an electromagnetic coupler with a wider coupling range.

In addition, since the four electromagnetic couplers 7 of the third embodiment are connected in parallel, the value of the input impedance $Z_{in}$ of the electromagnetic coupler 8 is half the value obtained from Eq. (4). However, because this value can be adjusted by changing the value of the capacitance C and other values, there is no problem with matching condition adjustments with the feeding system.

Besides, in the electromagnetic coupler 7 of the third embodiment, it is not easy to enlarge the second conductor pattern 7b in order to expand the area where the linear conductors 7d are disposed. More specifically, enlarging the second conductor pattern 7b changes the values of $Z_0'$, $l'$, and $\alpha'$, which changes the input impedance $Z_{in}$ of an electromagnetic coupler. As a result, the matching state with the feeding system is degraded, and therefore the radiation electric field intensity is degraded, causing a problem of the degradation of coupling strength of the electromagnetic coupler. Therefore, there is a limit to the size of the second conductor pattern 7b of the third embodiment.

Next, results and discussions of an experiment for an electromagnetic coupler in accordance with the fourth embodiment of the present invention will be described hereinafter.

Figure 11:
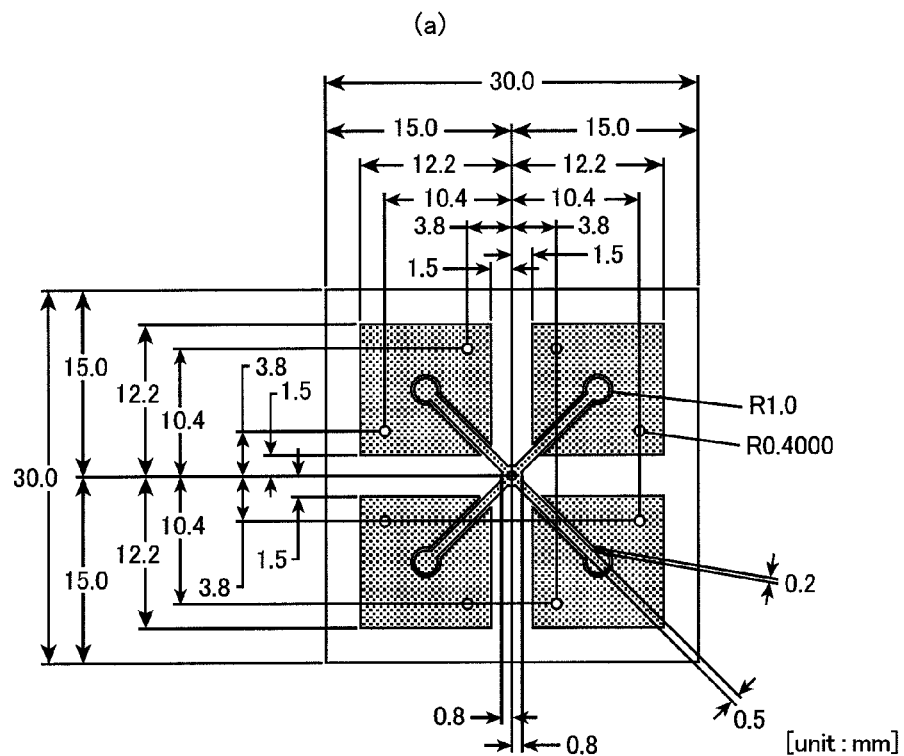
FIG. 11a and 11b are illustrations showing a plan view of a working example of the electromagnetic coupler in accordance with the fourth embodiment.
Figure 11:
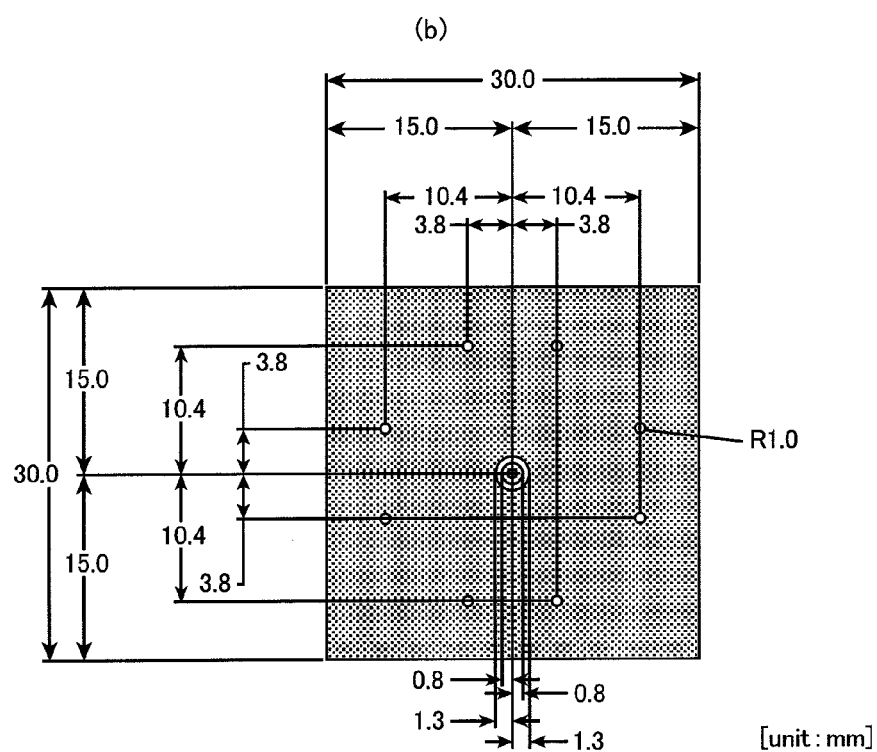

First, a working example of the electromagnetic coupler used in an experiment is described. FIG. 11 is illustrations showing a plan view of a working example of the electromagnetic coupler in accordance with the fourth embodiment. FIG. 11(a) shows the first conductor layer of the electromagnetic coupler, and FIG. 11(b) shows the second conductor layer of the electromagnetic coupler viewed in perspective from the first conductor layer side. Dimensions [unit: mm] of the electromagnetic coupler are also shown in FIG. 11. The electromagnetic coupler used in the experiment was formed with an FR4 double-side (two-layer) board of 1.6 mm in thickness.

Figure 9:
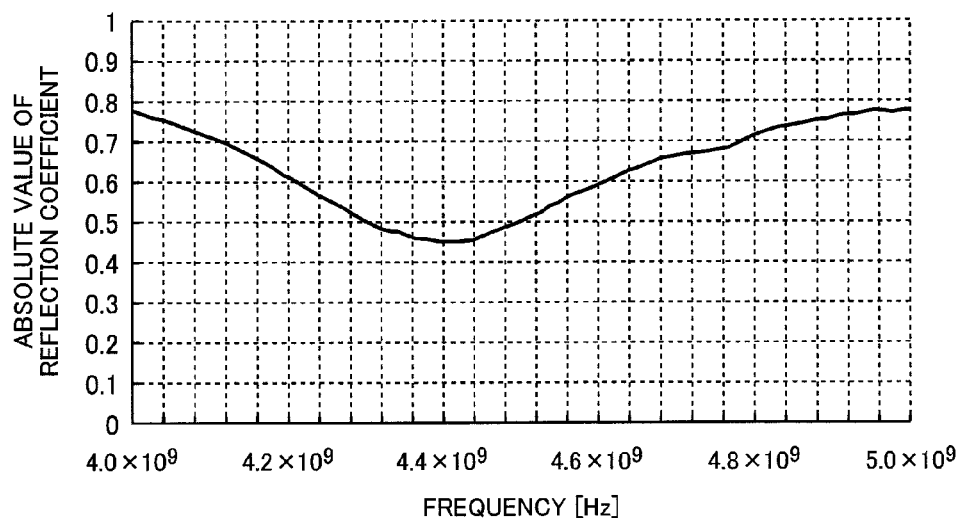
FIG. 9 is a graph showing an experimental result on the relationship between frequency and absolute value of the reflection coefficient of the electromagnetic coupler in accordance with the fourth embodiment of the present invention.

FIG. 9 is a graph showing an experimental result on the relationship between frequency and absolute value of the reflection coefficient in the electromagnetic coupler in accordance with the fourth embodiment of the present invention. The absolute value of the reflection coefficient was measured using a network analyzer. According to the experimental results shown in FIG. 9, the absolute value of the reflection coefficient is 0.7 or smaller in the frequency ranging from 4.12 to 4.76 GHz. It is verified that the working example of the electromagnetic coupler has broadband frequency characteristics.

Figure 12:
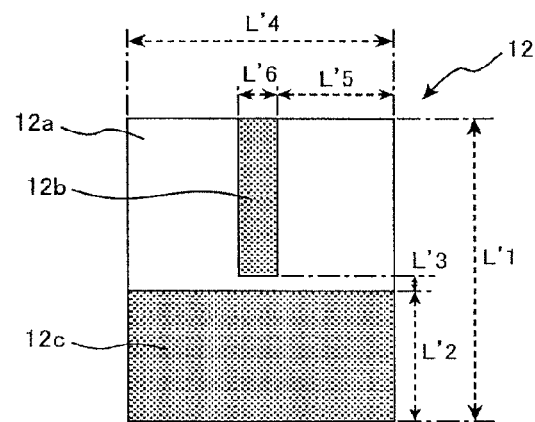
FIG. 12 is a schematic illustration showing a plan view of a conventional monopole antenna used in an experiment.

Next, was investigated a relationship between an input power-output power ratio and a distance between two electromagnetic couplers in accordance with the fourth embodiment and between two conventional monopole antennas. This experiment used the same electromagnetic couplers as the ones used in the experiment shown in FIG. 9. This experiment also used conventional monopole antennas shown in FIG. 12, as a comparative example. FIG. 12 is a schematic illustration showing a plan view of a conventional monopole antenna used in an experiment.

As shown in FIG. 12, a monopole antenna 12 is composed of a printed circuit board 12a and two rectangular conductors 12b and 12c formed on a surface of the printed circuit board 12a. The two rectangular conductors 12b and 12c are separated from each other. The rectangular conductor 12b operates as a radiation conductor, and the rectangular conductor 12c operates as a ground. The rectangular conductors 12b and 12c are fed with power. The monopole antenna 12 was formed with an FR4 one-side board of 2.4 mm in thickness. In FIG. 12, L'1=22.0 mm, L'2=10.0 mm, L'3=1.0 mm, L'4=20.0 mm, L'5=9.5 mm, and L'6=1.0 mm. The monopole antenna 12 is one of commonly used antennas and applied to wireless communications carried out by using traverse waves.

Figure 13:
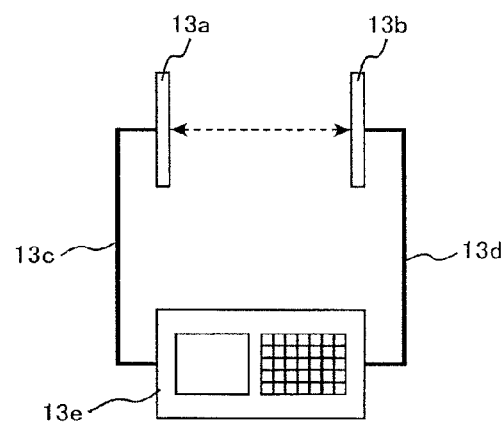
FIG. 13 is a schematic illustration showing a method for measuring an input power-output power ratio of specimens.

Next, the experimental system will be described hereinafter with reference to FIG. 13. FIG. 13 is a schematic illustration showing a method for measuring an input power-output power ratio of specimens. In this experiment, two specimens 13a and 13b to be measured, namely the two electromagnetic couplers shown in FIG. 11 or the two monopole antennas 12 shown in FIG. 12, were disposed such that they faced each other in parallel with a certain distance, and a perpendicular passing through the center of one specimen 13a passed through the center of the other specimen 13b. Also, the specimens 13a and 13b were connected to two terminals of a network analyzer 13e via coaxial cables 13c and 13d, respectively. A ratio of the input power from one specimen 13a to one terminal of the network analyzer 13e to the output power from the other terminal of the network analyzer 13e to the other specimen 13b (i.e., the absolute value of S21), namely the input power-output power ratio of the electromagnetic couplers faced each other or the monopole antennas faced each other was evaluated. The experiment was conducted by changing the distances between the two electromagnetic couplers and between the two monopole antennas.

Figure 10:
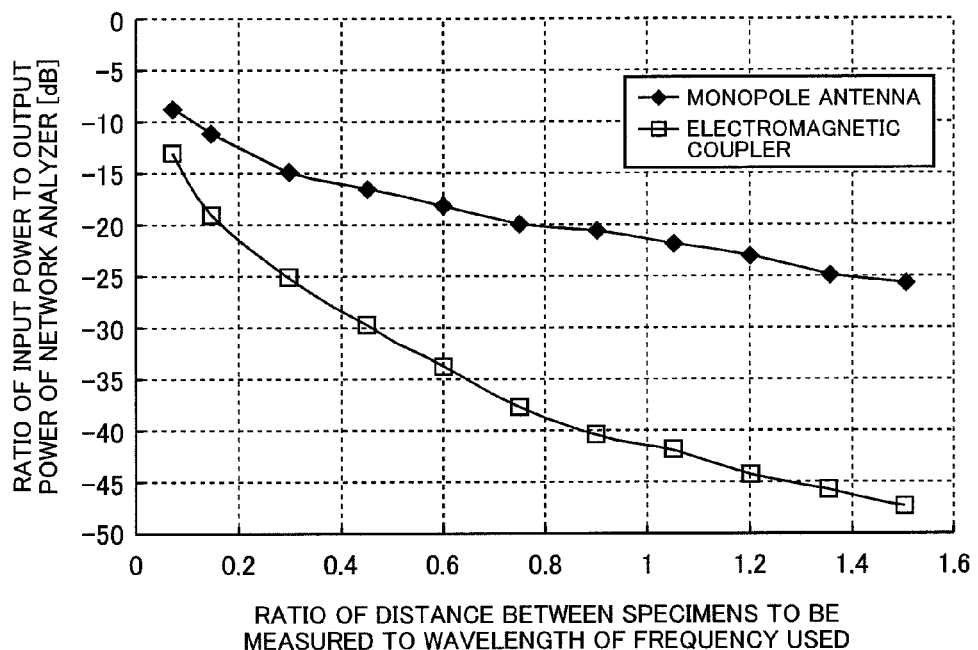
FIG. 10 is a graph showing an experimental result on the relationship between an input power-output power ratio and a distance between electromagnetic couplers in accordance with the fourth embodiment of the present invention and between conventional monopole antennas.

FIG. 10 is a graph showing an experimental result on the relationship between an input power-output power ratio (absolute value of S21) and a distance between electromagnetic couplers in accordance with the fourth embodiment of the present invention and between conventional monopole antennas. In the experiment, the frequency of the signals used was 4.5 GHz, and the horizontal axis of the graph in FIG. 10 represents the ratio of the distance between the specimens to the wavelength in this frequency used.

As shown in FIG. 10, in the electromagnetic coupler in accordance with the fourth embodiment of the present invention, wireless communications are carried out by using longitudinal waves where the amount of attenuation with respect to distance is larger than that with traverse waves. As a result, the absolute value of the slope of the absolute value of S21 vs. the distance is larger than that with the monopole antenna 12 with which wireless communications are carried out by using traverse waves. For example, when the ratio of the distance between the specimens to the wavelength is around 0.6, S21 of the electromagnetic coupler of FIG. 11 is about −34 dB as compared to about −18 dB with the monopole antenna 12. Meanwhile, as the ratio of the distance between the specimens to the wavelength decreases, the difference in the absolute value of S21 between the electromagnetic coupler of FIG. 11 and the monopole antenna 12 decreases. This indicates that the strength of wireless communications carried out by using the electromagnetic coupler of FIG. 11 is low over a long distance, and that the electromagnetic coupler of FIG. 11 is suitable for near-field wireless communications.

[Fifth Embodiment of the Invention]

Figure 14:
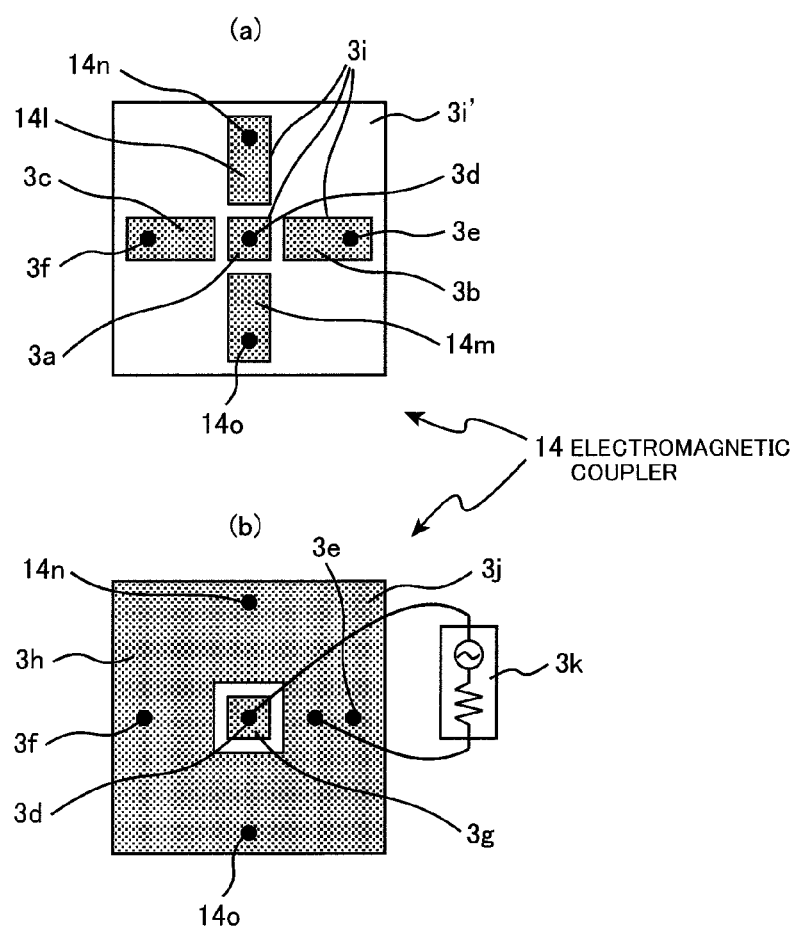
FIG. 14a and 14b are schematic illustrations showing a plan view of an electromagnetic coupler in accordance with a fifth embodiment of the present invention.

A fifth embodiment of the present invention will be described hereinafter with reference to FIG. 14. FIG. 14 is schematic illustrations showing a plan view of an electromagnetic coupler in accordance with a fifth embodiment of the present invention. FIG. 14(a) shows a first conductor layer of the electromagnetic coupler, and FIG. 14(b) shows a second conductor layer of the electromagnetic coupler viewed in perspective from the first conductor layer side.

As shown in FIG. 14, an electromagnetic coupler 14 of the fifth embodiment is configured by adding conductor patterns 14l and 14m as second conductor patterns and linear conductors 14n and 14o to the electromagnetic coupler 3 of the second embodiment. The shortest distance from the first conductor pattern 3a to each of the four conductor patterns 3b, 3c, 14l, and 14m as the second conductor patterns is λ/8 or smaller with respect to the wavelength λ of the central frequency of the frequency band of interest of the electromagnetic coupler 14. The two linear conductors 14n and 14o are formed perpendicularly to the second conductor layer 3j of the two-layer printed circuit board. The linear conductor 14n is connected to the conductor pattern 14l on one end and to the ground pattern 3h on the other end. The linear conductor 14o is connected to the conductor pattern 14m on one end and to the ground pattern 3h on the other end.

In the first conductor layer 3i, the linear conductors 14n and 14o are disposed such that a line passing through the linear conductors 3e, 3d, and 3f and a line passing through the linear conductors 14n, 3d, and 14o form a right angle. In other words, the four linear conductors 3e, 3f, 14n, and 14o are formed at an angular interval of 90 degrees around the connection point between the first conductor pattern 3a and the linear conductor 3d. Also, the conductor patterns 14l and 14m are disposed along a line passing thorough the linear conductors 14n, 3d, and 14o. In other words, the four rectangular conductor patterns 3b, 3c, 14l, and 14m as the second conductor patterns are arranged radially such that each of them faces each of the circumferential sides of the first conductor pattern 3a.

By adding the conductor patterns 14l and 14m and the linear conductors 14n and 14o, the electromagnetic coupler 14 of the fifth embodiment can radiate the longitudinal wave component of the electromagnetic waves generated by the linear conductors with less variation as compared to the second embodiment, and thus can reduce variations in communication capacity according to direction. Moreover, it is possible to add conductor patterns and linear conductors radially around the linear conductor 3d in the first conductor layer 3i. In this case, the variation in the longitudinal wave component of the electromagnetic waves emitted from the electromagnetic coupler can be further reduced.

In addition, in the electromagnetic coupler 14 of the present embodiment, because the second conductor patterns in the first conductor layer 3i has a symmetrical configuration with respect to a point, the traverse wave components of the magnetic waves radiated from the second conductor patterns are canceled, which reduces the traverse waves components, as is the case with the electromagnetic coupler 8 of the fourth embodiment.

[Sixth Embodiment of the Invention]

Figure 15:
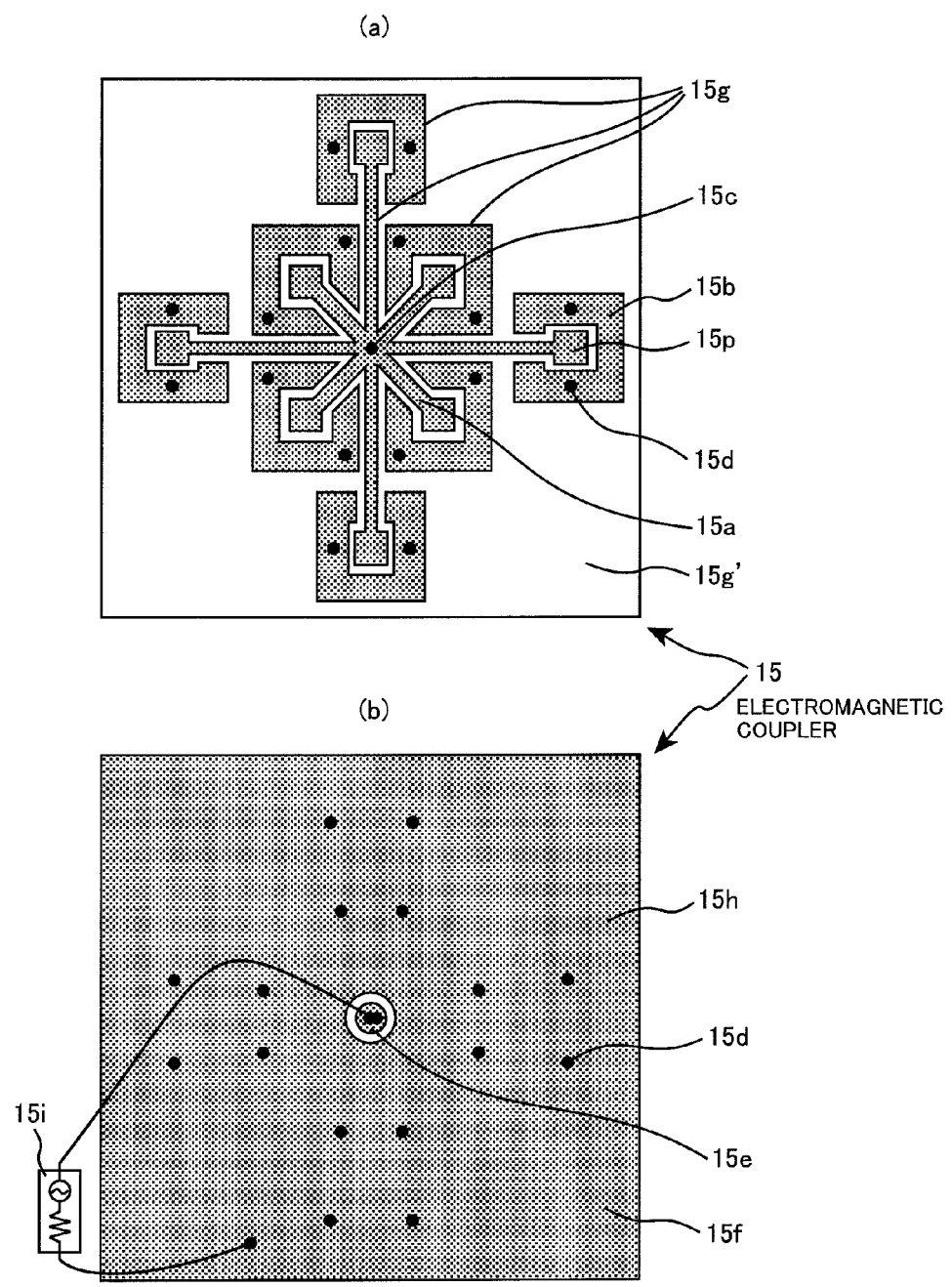
FIG. 15a and 15b are schematic illustrations showing a plan view of an electromagnetic coupler in accordance with a sixth embodiment of the present invention.

A sixth embodiment of the present invention will be described hereinafter with reference to FIG. 15. FIG. 15 is schematic illustrations showing a plan view of an electromagnetic coupler in accordance with a sixth embodiment of the present invention. FIG. 15(a) shows a first conductor layer of the electromagnetic coupler, and FIG. 15(b) shows a second conductor layer of the electromagnetic coupler viewed in perspective from the first conductor layer side.

As shown in FIG. 15, in an electromagnetic coupler 15 in accordance with the sixth embodiment, eight of the electromagnetic couplers 7 according to the third embodiment are connected in parallel such that they share the linear conductor 7c. More specifically, the electromagnetic coupler 15 includes: a first conductor pattern 15a extending radially from the center of a printed circuit board in eight directions and eight second conductor patterns 15b separated from the first conductor pattern 15a, the first conductor pattern 15a and the second conductor patterns 15b being formed in a first conductor layer 15g, the first conductor layer 15g being disposed on one side of a dielectric layer 15g' of the printed circuit board; a feed pattern 15e connected to a feeding system 15i and a ground pattern 15f separated from this feed pattern 15e, the feed pattern 15e and the ground pattern 15f being formed in a second conductor layer 15h on the other side of the printed circuit board; and a linear conductor 15c formed at the center of the first conductor pattern 15a. In addition, two linear conductors 15d are formed between the ground pattern 15f and each of the second conductor patterns 15b.

The first conductor pattern 15a extends radially in eight directions at an angular interval of 45 degrees. The eight extending portions are alternately short and long. Each of the extending portions of the first conductor pattern 15a has a broad rectangular end portion 15p. Each of the eight-second conductor patterns 15d is configured such that its inner edge matches the shape of each of the rectangular end portions 15p.

The linear conductor 15c is connected to the first conductor pattern 15a on one end and to the feed pattern 15e on the other end. Similarly, each of the linear conductors 15d is connected to each of the second conductor patterns 15b on one end and to the ground pattern 15f on the other end. The linear conductors 15c and 15d are formed perpendicularly to the second conductor layer 15h.

In the electromagnetic coupler 15 thus formed, a plurality of the electromagnetic couplers 7 of the third embodiment are arranged in a configuration that is planar and symmetrical with respect to a point. As a result, the arrangement of the linear conductors 15d radiating longitudinal waves extends over a wider area, which makes it possible to enlarge the coupling range. And at the same time, the radiation of the traverse wave component from electromagnetic waves can be reduced.

[Seventh Embodiment of the Invention]

Figure 16:
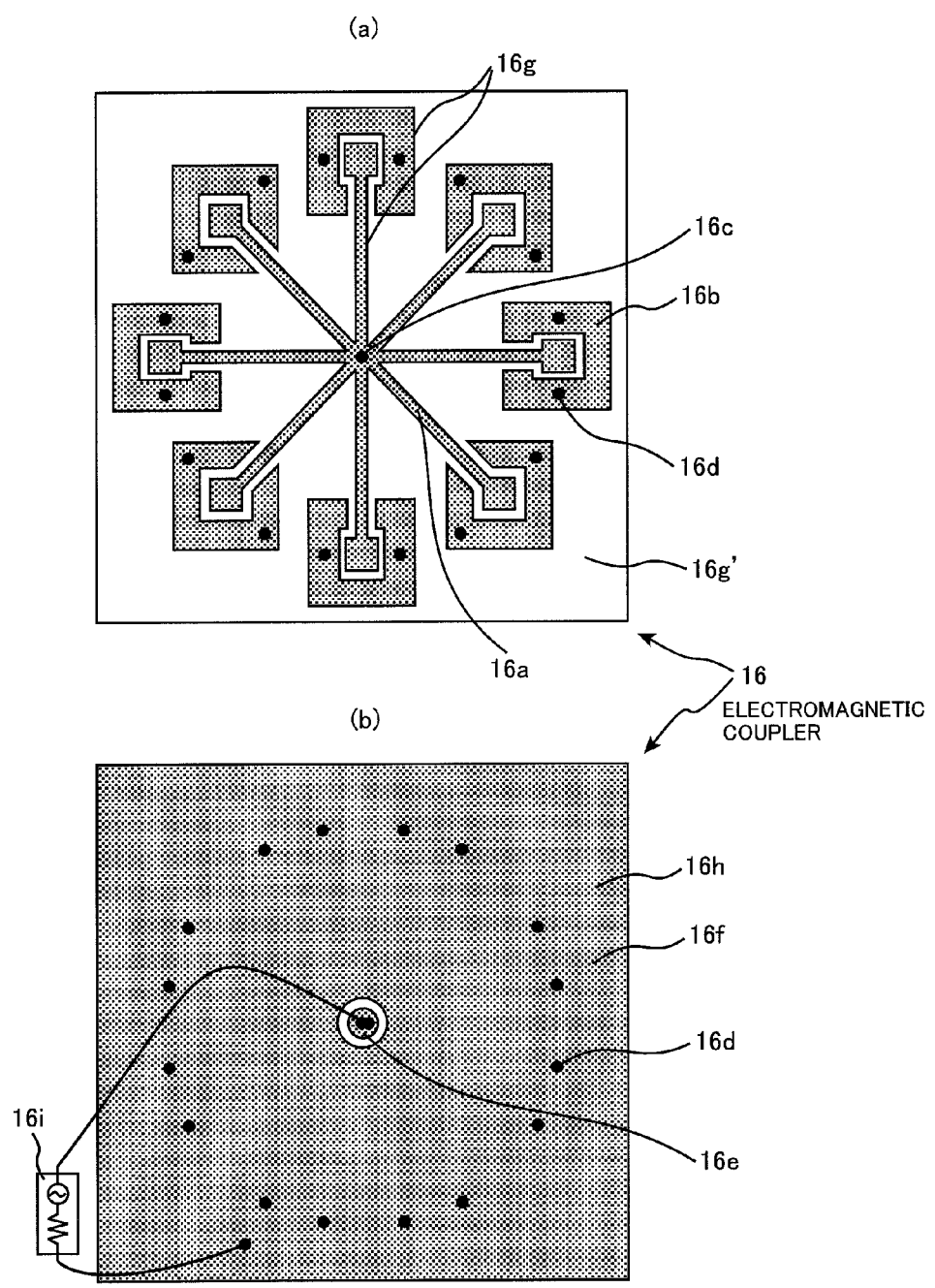
FIG. 16a and 16b are schematic illustrations showing a plan view of an electromagnetic coupler in accordance with a seventh embodiment of the present invention.

A seventh embodiment of the present invention will be described hereinafter with reference to FIG. 16. FIG. 16 is schematic illustrations showing a plan view of an electromagnetic coupler in accordance with a seventh embodiment of the present invention. FIG. 16(a) shows a first conductor layer of the electromagnetic coupler, and FIG. 16(b) shows a second conductor layer of the electromagnetic coupler viewed in perspective from the first conductor layer side.

As shown in FIG. 16, an electromagnetic coupler 16 of the seventh embodiment is formed by equalizing the length of the portions extending radially in eight directions of the first conductor pattern in the electromagnetic coupler 15 of the sixth embodiment. More specifically, the electromagnetic coupler 16 includes: a first conductor pattern 16a extending radially at an angular interval of 45 degrees from the center of a printed circuit board and eight second conductor patterns 16b separated from the first conductor pattern 16a, the first conductor pattern 16a and the second conductor patterns 16b being formed in a first conductor layer 16g, the first conductor layer 16g being disposed on one side of a dielectric layer 16g' of the printed circuit board; a feed pattern 16e connected to a feeding system 16i and a ground pattern 16f separated from this feed pattern 16e, the feed pattern 16e and the ground pattern 16f being formed in a second conductor layer 16h on the other side of the printed circuit board; and a linear conductor 16c formed at the center of the first conductor pattern 16a. In addition, two linear conductors 16d are formed between the ground pattern 16f and each of the second conductor patterns 16b.

The electromagnetic coupler 16 of the seventh embodiment not only has similar advantages to those of the electromagnetic coupler 15 of the sixth embodiment, but also can reduce the variation in the coupling range. In order to increase the coupling range, more than eight of the electromagnetic couplers 7 of the third embodiment may be disposed in parallel.

It should be evident that various changes and modifications may be made to the embodiments of the present invention described above with reference to the drawings by those skilled in the art without departing from the technical concept and scope of the present invention.

For example, although a first conductor pattern and a second conductor pattern are formed on one side of a two-layer printed circuit board, and a feed pattern and a ground are formed on the other side of the printed circuit board in the above embodiments, two layers of a three- or more-layer printed circuit board may be used. Also, in the above embodiments, an electromagnetic coupler is fabricated using a two-layer printed circuit board; however, it can be fabricated using a conductor plate of copper, iron, etc. instead of any printed circuit board. Moreover, although the air gap between the first conductor pattern and the second conductor pattern is used as a capacitance in the above embodiments, another capacitance (chip capacitance, for example) may be added between the first conductor pattern and the second conductor pattern. All the changes and modifications such as these should be included in the technical concept and scope of the present invention.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. An electromagnetic coupler, comprising:
   a first conductor layer, including: a first conductor pattern, and a second conductor pattern separated from the first conductor pattern;
   a second conductor layer, formed parallel to the first conductor layer, including: a feed pattern connected to a feeding system, and a ground pattern separated from the feed pattern; and
   a plurality of linear conductors, formed between the first conductor layer and the second conductor layer, electrically connecting the first conductor pattern with the feed pattern, and connecting the second conductor pattern with the ground pattern;
   wherein:
   the first conductor pattern is configured to extend toward the second conductor pattern, the second conductor pattern is configured around at least an end of the first conductor pattern, and the at least an end of the first conductor pattern is broader than a middle portion of the first conductor pattern,
   or alternatively,
   each of the first conductor pattern and the second conductor pattern is configured into a rectangular shape, the second conductor pattern is composed of four rectangular conductor patterns, and the four rectangular conductor patterns are arranged radially such that each of the four rectangular conductor patterns faces each of a plurality of circumferential sides of the first conductor pattern.

2. The electromagnetic coupler according to claim 1, wherein the plurality of linear conductors are formed perpendicularly to the second conductor layer.

3. The electromagnetic coupler according to claim 1, further comprising:
   a dielectric layer formed between the first conductor layer and the second conductor layer; and
   the plurality of linear conductors are formed inside through holes formed in the dielectric layer.

4. The electromagnetic coupler according to claim 3, wherein the first conductor layer, the second conductor layer, and the dielectric layer therebetween are made of a two-layer printed circuit board.

5. The electromagnetic coupler according to claim 1, wherein the second conductor pattern is formed such that the second conductor pattern faces the ground pattern.

6. The electromagnetic coupler according to claim 1, wherein the second conductor pattern and the plurality of linear conductors are configured such that they are symmetrical with respect to a connection point between the first conductor pattern and the plurality of linear conductors.

7. The electromagnetic coupler according to claim 1, wherein the shortest distance between the first conductor pattern and the second conductor pattern is $\lambda/8$ or smaller with respect to a wavelength $\lambda$ of a central frequency of a frequency band of interest for the electromagnetic coupler.

8. The electromagnetic coupler according to claim 1, wherein:
the second conductor pattern is composed of a plurality of conductor patterns; and
the first conductor pattern extends radially toward each of the plurality of conductor patterns composing the second conductor pattern.

9. The electromagnetic coupler according to claim 8, wherein the plurality of conductor patterns composing the second conductor pattern are connected to the ground pattern by the plurality of linear conductors.

10. An information communication device equipped with an electromagnetic coupler to communicate information by using an electrostatic field or an induced electric field, the electromagnetic coupler comprising:
a first conductor layer, including: a first conductor pattern, and a second conductor pattern separated from the first conductor pattern;
a second conductor layer, formed parallel to the first conductor layer, including: a feed pattern connected to a feeding system, and a ground pattern separated from the feed pattern; and
a plurality of linear conductors, formed between the first conductor layer and the second conductor layer, electrically connecting the first conductor pattern with the feed pattern, and connecting the second conductor pattern with the ground pattern;
wherein:
the first conductor pattern is configured to extend toward the second conductor pattern, the second conductor pattern is configured around at least an end of the first conductor pattern, and the at least an end of the first conductor pattern is broader than a middle portion of the first conductor pattern,
or alternatively,
each of the first conductor pattern and the second conductor pattern is configured into a rectangular shape, the second conductor pattern is composed of four rectangular conductor patterns, and the four rectangular conductor patterns are arranged radially such that each of the four rectangular conductor patterns faces each of a plurality of circumferential sides of the first conductor pattern.

11. An electromagnetic coupler, comprising:
a first conductor pattern and at least one second conductor pattern separated from the first conductor pattern, the first conductor pattern and the at least one second conductor pattern being formed in a first conductor layer;
a feed pattern connected to a feeding system and a ground pattern separated from the feed pattern, the feed pattern and the ground pattern being composed of a conductor and formed in a second conductor layer; and
a plurality of linear conductors electrically connecting the first conductor pattern with the feed pattern, and connecting the at least one second conductor pattern with the ground pattern, the plurality of linear conductors being formed between the first conductor layer and the second conductor layer;
wherein the first conductor layer and the second conductor layer are parallel to each other;
wherein each of the first conductor pattern and the at least one second conductor pattern is configured into a rectangular shape;
wherein the at least one second conductor pattern is composed of four rectangular conductor patterns; and
wherein the four rectangular conductor patterns are arranged radially such that each of the four rectangular conductor patterns faces each of a plurality of circumferential sides of the first conductor pattern.

* * * * *